Patented Dec. 30, 1952

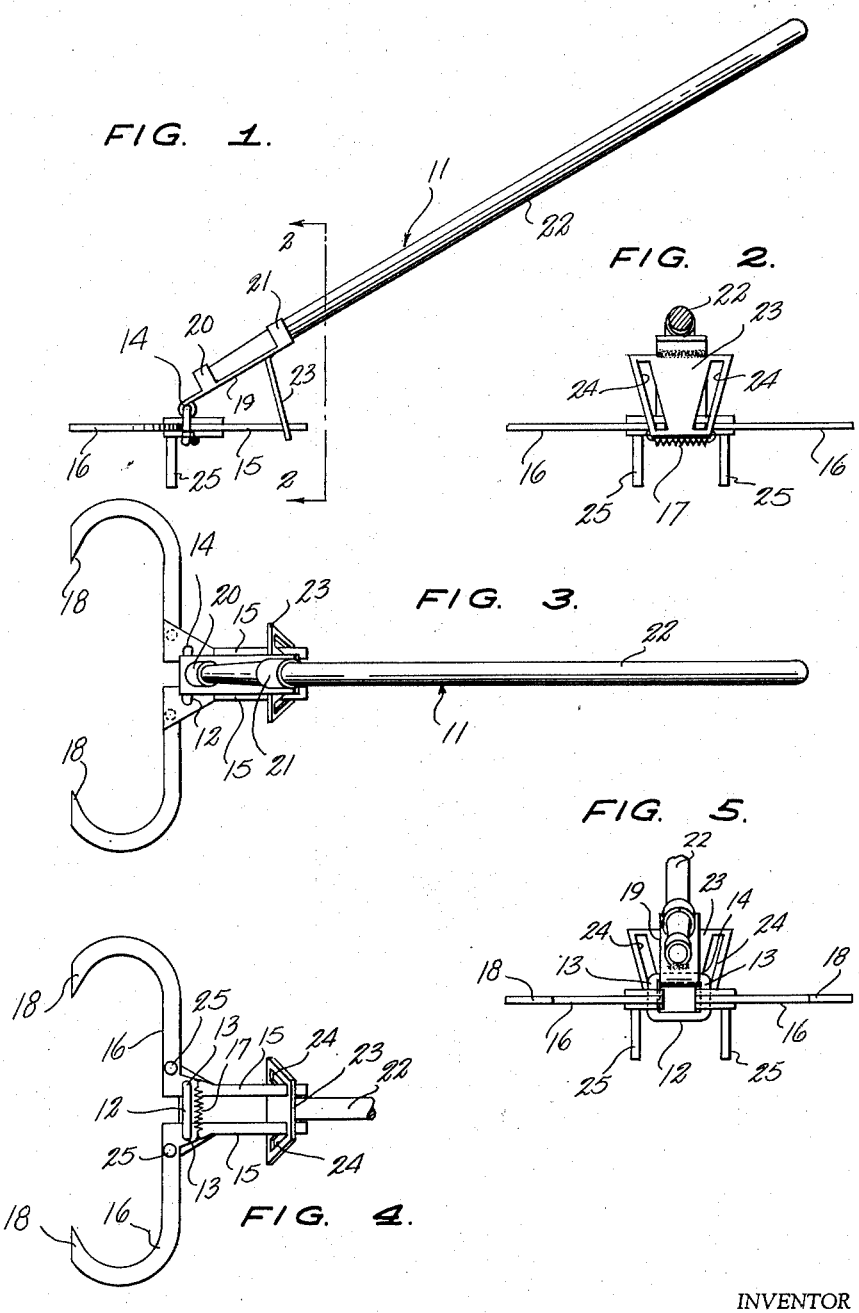

2,623,770

UNITED STATES PATENT OFFICE 2,623,770

CONTROL FOR SETTING PILING

George W. Eby, Oregon City, Oreg.

Application September 14, 1951, Serial No. 246,680

4 Claims. (Cl. 294—19)

This invention relates to implements for handling poles, and more particularly to an improved implement enabling a single man to completely control the positioning of a pole during the setting thereof, as for example, inserting poles for piling.

A main object of the invention is to provide a novel and improved pole-handling implement which is simple in construction, which is easy to operate, and which provides a safe means of gripping a pole to guide the pole into position for setting thereof.

A further object of the invention is to provide an improved pole-handling implement which involves relatively inexpensive parts, which is rugged in construction, which is easy to manipulate, and which is light in weight.

Further objects and advantages of the invention will become apparent from the following description and claims, and from the accompanying drawings, wherein:

Figure 1 is a side elevational view of an improved pole-handling implement constructed in accordance with the present invention;

Figure 2 is a cross-sectional view taken on the line 2—2 of Figure 1;

Figure 3 is a top view of the implement illustrated in Figure 1;

Figure 4 is a fragmentary bottom view of the implement of Figures 1 to 3;

Figure 5 is a fragmentary front elevational view of the implement of Figures 1 to 4.

Referring to the drawings, the improved pole-handling implement is designated generally at 11. Said implement comprises a rectangular ring member 12 having the side arms 13, 13 and the top arm 14. Designated at 16, 16 are respective opposing hook members which are pivotally engaged with the side arms 13, 13 for rotation towards and away from each other in a common plane, the hook elements being formed with rearwardly extending, coplanar arms 15, 15 which are connected together rearwardly adjacent the ring member 12 by a coil spring 17, biasing the hook portions 18, 18 away from each other. Designated at 19 is a rigid bracket member which is hinged to the top arm 14 of the ring member 12 for rotation in a plane normal to the plane of the hook members 16, 16. The bracket member 19 is formed with the spaced rings 20, 21 in which is secured the elongated wooden handle 22. Rigidly secured to the outer end portions of the bracket member 19 is a depending plate member 23, said plate member being formed adjacent its side margins with the downwardly converging slots 24, 24 which slidably receive the rear end portions of the arms 15, 15.

It will be readily apparent that when the handle 22 is rotated downwardly from the position of Figure 1, the slots 24, 24 exert a camming action on the arms 15, 15, urging said arms outwardly and thereby causing the hook members 16, 16 to be rotated around the side arms 13, 13 of the ring member 12 to bring the hook portions 18, 18 towards each other. Thus, in using the device to move a suspended pole into a desired position the operator grasps the handle 22 and manipulates the device so that the pole which is to be guided is received between the hook portions 18, 18. With the suspended pole arranged between the hook portions 18, 18 and the main arms of the hook members in abutment with the pole, the operator then rapidly exerts a downward force on the handle 22, thereby causing the hook portions 18, 18 to move towards each other and to become embedded in the pole. With the handle 22 held depressed, and with the hook portions 18 embedded in the pole, the operator can then move the pole to a desired position by means of handle 22 for the setting thereof, for example, into a hole in the ground, and after the pole has been set, the tool can be disengaged from the pole by elevating the handle 22, whereby the hook portions 18, 18 are moved outwardly as the end portions of arms 15, 15 return to the positions thereof illustrated in Figure 2. The return of the arms 15, 15 to their initial positions, illustrated in Figure 2, is assisted by the biasing action exerted on the arms 15, 15 by the coil spring 17.

In order to facilitate the engagement of the hook members 16, 16 against the pole, the hook members 16, 16 are provided at their inner portions with the depending rod elements 25, 25, which are rigidly secured to the hook members 16, 16 forwardly adjacent the side arms of the ring member 12, as shown in Figure 4, and which serve as guides for properly aligning the tool on the pole to be engaged and as abutment means providing a fulcrum for rotating handle 22 downwardly relative to hook members 16, 16. The depending rigid rod elements 25, 25 thus provide a bearing support abutting the pole which maintains the hook elements 16, 16 substantially in a plane normal to the axis of the pole when the handle 22 is rotated downwardly, as above described.

While a specific embodiment of an improved pole-engaging tool has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A pole-engaging tool comprising a rectangular ring member, respective coplanar opposing hook members pivoted to the opposite side elements of said ring member, an elongated handle pivoted to the top element of said ring member, a depending plate member rigidly secured to said handle, said plate member being formed with a pair of downwardly converging slots, respective rearwardly extending arms rigidly secured to said hook members and slidably received in said slots, and respective depending abutment elements on said hook members engageable with a pole received between the hook members whereby the hook members are rotated relative to each other responsive to rotation of said handle relative to said ring member.

2. A pole-engaging tool comprising a rectangular ring member, respective coplanar opposing hook members pivoted to the opposite side elements of said ring member, an elongated handle pivoted to the top element of said ring member, a depending plate member riidly secured to said handle, said plate member being formed with a pair of downwardly converging slots, respective rearwardly extending arms rigidly secured to and arranged in the same plane as said hook members and slidably received in said slots, respective depending abutment elements on said hook members engageable with a pole received between the hook elements, whereby the hook members are rotated inwardly relative to each other responsive to rotation of the handle relative to said ring member, and spring means connecting said arms and biasing said hook members towards outwardly rotated positions.

3. A pole-engaging tool comprising a support member, a pair of opposing hook members pivoted to opposite sides of said support member and arranged in the same plane, a handle pivoted to said support member for rotation in a plane normal to the plane of the hook members, a depending cam plate rigidly secured to said handle, respective rearwardly extending elements rigidly secured to said hook members and cammingly engaging said cam plate, said last-named elements being arranged to rotate the hook members relative to each other in a common plane responsive to rotation of said handle relative to said support member, and depending abutment means on said hook members engageable with a pole received between said hook members.

4. A pole-engaging tool comprising a support member, a pair of opposing hook members pivoted to opposite sides of said support member and arranged in the same plane, a handle pivoted to said support member for rotation in a plane normal to the plane of the hook members, a depending cam plate rigidly secured to said handle, respective rearwardly extending elements rigidly secured to said hook members and cammingly engaging said cam plate, said last-named elements being arranged to rotate the hook members relative to each other in a common plane responsive to rotation of said handle relative to said hook members, and respective depending abutment elements rigidly secured to said hook members adjacent to the opposite sides of said support member and being engageable with a pole received between said hook members.

GEORGE W. EBY.

No references cited.